Sept. 24, 1929.   J. SELLS   1,729,365

FELLING AXE

Filed July 26, 1927

INVENTOR
John Sells
BY
Pierre Barnes
ATTORNEY

Patented Sept. 24, 1929

1,729,365

UNITED STATES PATENT OFFICE

JOHN SELLS, OF SEATTLE, WASHINGTON

FELLING AX

Application filed July 26, 1927. Serial No. 208,453.

This invention relates to tree felling axes and, more especially, to an improved construction of an ax-poll therefor.

An object of the invention, generally, is to produce a poll of the double-bit type whereby under-cut chopping in the felling of a tree is facilitated with less labor to the axman than hitherto.

A more specific object is to provide an ax-poll the conformation of which is such that it will produce a smoother cut and more readily dislodge the chips than attained by other felling axes known to me.

Another specific object is to produce an ax-poll wherein the material is best distributed to apply the weight thereof most suitably for accomplishing its cutting and chip throwing functions.

Another specific object is to provide an ax-poll which is readily ground and kept in good condition.

With the above and other ends in view the invention consists in the novel construction and adaptation of devices hereinafter described and claimed.

In the accompanying drawing,—

Figure 1:
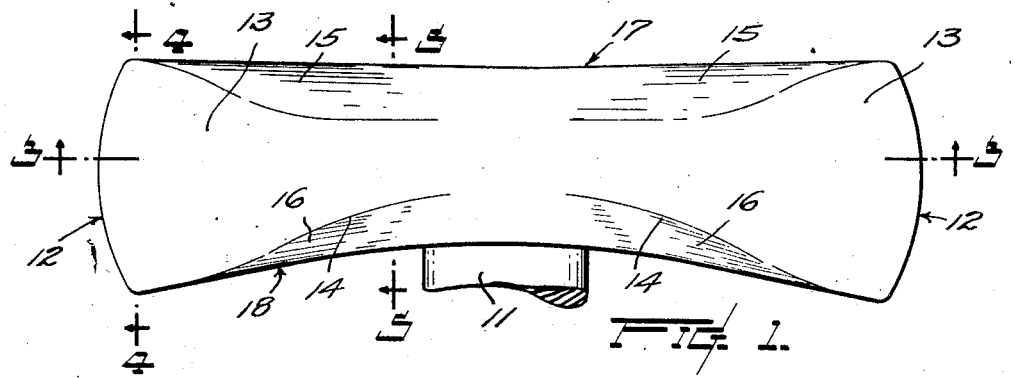
Figure 2:
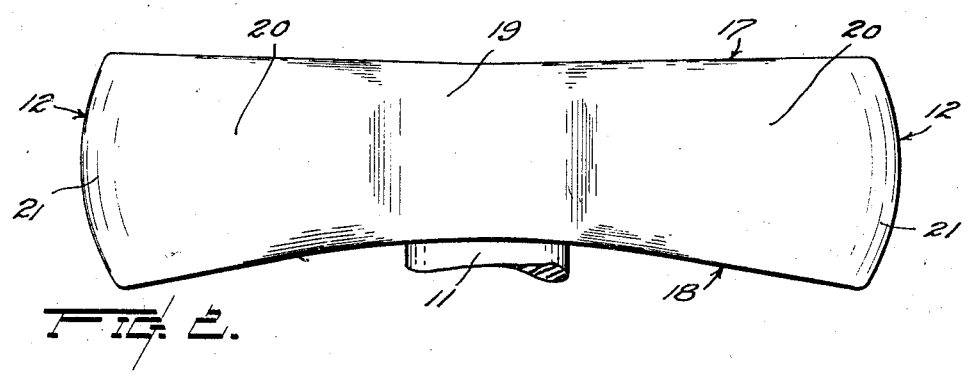
Figure 3:
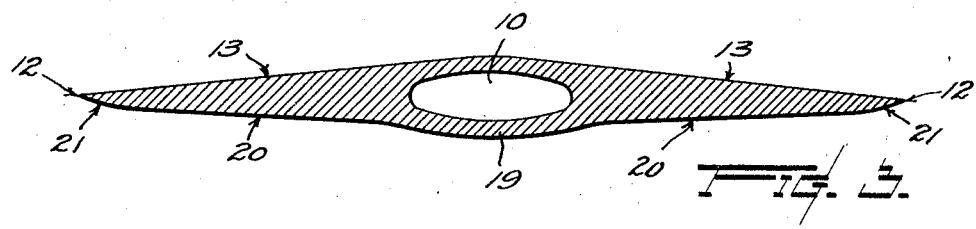
Figure 4:
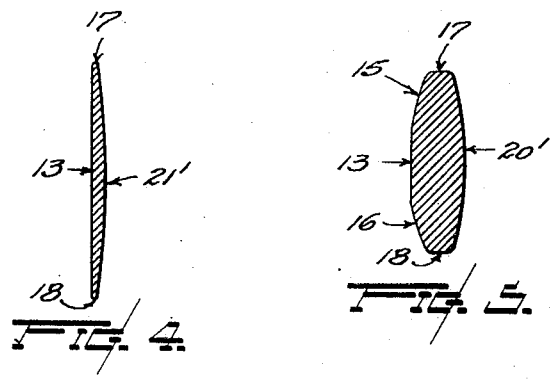
Figure 5:
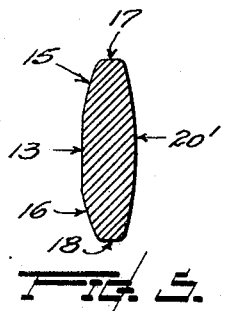

Figure 1 is a front side elevation, and Fig. 2 is a rear side elevation of an ax-poll embodying my improvements, a portion of the handle or helve being shown in both views. Fig. 3 is a longitudinal vertical section on line 3—3 of Fig. 1 with the handle omitted; and Figs. 4 and 5 are transverse sections on lines 4—4 and 5—5 of Fig. 1.

The ax-poll is provided centrally of its length with an elliptical eye 10 to receive a handle 11. As shown in Figs. 1 and 2 the poll is made progressively wider from its central portion to the cutting edges 12 at both ends. Said cutting edges are both arranged so as to be contained in the plane of the major axis of the elliptical eye 10. The poll, horizontally, has a general taper, see Fig. 3, from its central portion to each of its cutting edges. The front side of the poll is formed with substantially plane surfaces 13 each of the full width of the poll at the respective cutting edge and thence narrowing gradually as at 14, Fig. 1, into proximity to the mid-length of the poll. The surfaces 15 and 16 above and below the plane surfaces 13 are curved therefrom to the top and bottom edges 17 and 18 respectively.

The surface of the rear side (Fig. 2) of the poll is provided centrally of its length with a swelling 19, to accommodate the eye 10. From opposite sides of such swelling the rear surface extends in substantially straight lines as at 20 (Fig. 3) to a convex portion 21 in proximity to the respective cutting edge 12. The curvature of the surface portion 21 and the angular relation of the same with respect to the planes of the adjacent surfaces 13 are such as will afford at the cutting edge a bevel most suitable for turning or throwing a chip. Such convex surface is also made convex transversely of the poll as indicated at $20^1$ and $21^1$ respectively in Figs. 4 and 5.

The positioning of both surfaces 13 upon the front side of the poll provides an ax suitable for either a right or left hand chopper, thus enabling it to be used interchangeably by two men acting together.

The distribution of the material in my improved poll affords a central fullness, longitudinally and transversely, requisite for strength.

The distribution of the material, moreover, is such as to produce a well balanced ax, the center of gravity of the mass thereof being in a plane which passes through the bevels 21 in close proximity to the cutting edges at both ends of the poll to permit more penetration of the ax in its successive blows.

For felling a tree to produce saw logs, or the like, the practice is to chop out a notch above a saw cut in the tree on that side toward which the tree is to be thrown, and for which action my ax is peculiarly adapted when swung by either a left or right hand chopper. In this sort of work the front side of either of the bits is used uppermost against the solid wood, so to speak, to produce a smooth cut; the beveled, or rear, side of the bit being underneath, to cast the chips outwardly and downwardly from the work.

In felling small trees, however, both the upper and lower cuts of a notch may advantageously be performed by the present invention by using one bit for the upper cut and the other bit for the lower cut, using the front side against solid wood above and below alternately.

The construction and manner of using my invention will, it is thought be understood from the foregoing description.

What I claim, is,—

1. As a new article of manufacture, an ax-poll having an elliptical eye to receive a handle and two cutting edges contained in the plane of the major axis of said eye, the front side of the poll having two plane surfaces extending from in proximity of the midlength of the poll to the respective cutting edges, the rear side of the poll being formed to provide two spaced apart portions extending in approximately straight lines from near the midlength of the poll to bevel surfaces provided at the respective cutting edges.

2. A new article of manufacture as defined in claim 1, wherein the eye of the poll is positioned transversely of the poll to provide a protuberance at the midlength of the rear side, the straight line portions of said rear side extending from said protuberance to the respective bevel portions.

3. As a new article of manufacture, the poll of a chopping ax of the double bit type with an eye centrally of its length, one side of said poll being formed of two plane surfaces arranged in angular relation with respect to each other and extending from in proximity of the midlength of the poll to the respective cutting edges, the other side of said poll being beveled at its opposite ends to provide said cutting edges, a swelling in the region of the eye, and convex portions extending from said swelling to the respective bevels.

Signed at Seattle, Washington, this 30th day of June 1927.

JOHN SELLS.